United States Patent [19]

Carof et al.

[11] Patent Number: 4,647,930
[45] Date of Patent: Mar. 3, 1987

[54] PASSIVE RADAR RESPONDER

[75] Inventors: Alain Carof, Paris; Maurice Marchand, Sevran, both of France

[73] Assignee: LMT Radio Professionnelle, Boulogne Billancourt, France

[21] Appl. No.: 657,785

[22] Filed: Oct. 4, 1984

[30] Foreign Application Priority Data

Oct. 11, 1983 [FR] France ................................ 83 16140

[51] Int. Cl.$^4$ .............................................. G01S 13/74
[52] U.S. Cl. ............................................ 342/6; 342/51
[58] Field of Search ......... 343/6.5 R, 6.5 LC, 6.5 SS, 343/6.8 R, 6.8 LC, 18 D; 340/505

[56] References Cited

U.S. PATENT DOCUMENTS

| 3,391,404 | 7/1968 | Vogelman | 343/6.5 R |
| 3,568,194 | 3/1971 | Wilson et al. | 343/18 D |
| 4,075,632 | 2/1978 | Baldwin et al. | 343/6.8 R |
| 4,163,233 | 7/1979 | Becker | 343/6.5 R |
| 4,278,977 | 7/1981 | Nossen | 343/6.5 LC |

FOREIGN PATENT DOCUMENTS

| 3010264 | 9/1981 | Fed. Rep. of Germany . |
| 1489713 | 7/1967 | France . |
| 2260115 | 8/1975 | France | 343/6.5 SS |

Primary Examiner—Thomas H. Tarcza
Assistant Examiner—Bernarr Earl Gregory
Attorney, Agent, or Firm—Roland Plottel

[57] ABSTRACT

The invention concerns beacons associated to radars.

It consists in modulating the re-emitted signal, in phase by the frequency of a vocal signal, and in amplitude by the envelope of this signal.

It allows vocal transmission between such a signal and a Doppler radar.

5 Claims, 7 Drawing Figures

PASSIVE RADAR RESPONDER

BACKGROUND OF THE INVENTION

1. Field of the Invention

The present invention concerns passive radar responders or answering equipment that allow to send back towards a radar, especially a Doppler radar, a much wider fraction of the signals emitted by said radar than that due to natural reflection on the most reflecting objects.

2. Description of the Prior Art

It is known to utilize as a passive reflector a rectangular trihedron of the "cube corner" type, or a Luneburg lens.

In a more complex manner, it is known to use a network of dipoles connected together to be in phase and connected to a short-circuit. The radar signal received is re-emitted at the pace of this manipulation in a direction determined by the antenna or aerial equivalent to the dipoles network. This network can be constituted for very short frequencies by a simple triplate circuit on which the dipoles are photoengraved. Thereby in band X with $8 \times 8$ dipoles disposed on a plate of about $30 \times 30$ cm$^2$, a principal response lobe having an opening of 8° is obtained. Such directivity is particularly useful when it is required to localize a point with discretion.

When the fixed echoes are eliminated, especially by using the Doppler effect, it is necessary to modulate the re-emission in order to simulate movement of the responder.

SUMMARY OF THE INVENTION

In order to achieve this aim a system similar to that illustrated schematically in FIG. 1 is used.

The wave received from the radar by the aerial 11 is reflected by a short-circuit 12 towards this same aerial through a controllable phase shifter 13. The wave is then returned by the aerial towards the radar with a phase that is dependent upon the state of the phase shifter. This state is controlled by a control circuit 14 that operates from a reference oscillator 15.

The phase shifter 13, is, for example, of the type represented in FIG. 2. The connection with the aerial 11 is made through the intermediary of a guide element 21. This is provided with two guide portions 22 of length 1 and 23 of length L that are at right angles to it and are connected to the ground respectively by two diodes 24 and 25 connected in opposite directions. The junction of these three guides is connected to the output of an amplifier 26 that is mounted peak limiter-wise so as to supply an output signal capable of assuming one of two values $+V$ and $-V$ allowing to saturate respectively the two diodes. To achieve this result, the amplifier receives on its input E, for example, a binary signal at the frequency Fo, of which one of the states corresponds to $+V$ and the other to $-V$.

Under these conditions, when a diode is saturated, the corresponding guide is short-circuited at the ground, and it is disconnected in the opposite direction. Therefore, the phase shift of the re-emitted ultra high frequency (UHF) wave re-emitted between these two states is equal to $2\pi (L-1)/\lambda$, $\lambda$ being the length of the hyperfrequency wave. The maximum signal detected by the Doppler effect in the radar will be obtained for a phase shift equal to $\pi$, that therefore corresponds to $L-1=\lambda/2$. In fact, as represented in the top part of FIG. 3, after discrimination the obtained signal thus comprises impulses at recurrence frequency $F_R$, of maximal amplitude and reversed polarities at frequency $F_o$. The output Doppler signal will thus be, as represented at the bottom of this FIG. 3, a square signal of frequency $F_o$ that reproduces the modulation signal at input E of the phase shift 13.

It is easy to take for this frequency $F_o$ an audible value, particularly easy to exploit. This value will thus be that supplied by generator 15.

In order to individualize further the responder, this audible frequency can be hatched, for example, through the use of logic circuits contained in the modulator 14 and also operating from the generator 15, in order to represent a particular signal. FIG. 4 represents, for example, a modulation extending over 2.75 seconds and corresponding to the letter A in Morse Code. On this figure, the hatched parts correspond to the audible frequency, and the others to silences during which the phase shifter 13 is in a fixed state.

Such a beacon thus allows to indicate a particular point. It is desirable that an operator using the beacon be able to transmit messages that are non-determined in advance. To achieve this aim can be used, for example, a Morse key as switch between the generator 15 and the phase shifter 13. Such a process is long and difficult to operate.

In order to transmit especially vocal messages, the invention proposes to modulate the re-emitted signal, in phase by the frequency of the vocal signal and in amplitude by its envelope.

BRIEF DESCRIPTION OF THE DRAWINGS

Other particularities and advantages of the invention will appear clearly in the following description, given by way of non-limitative example and with reference to the annexed drawings in which.

DESCRIPTION OF THE PREFERRED EMBODIMENT

Figure 1:
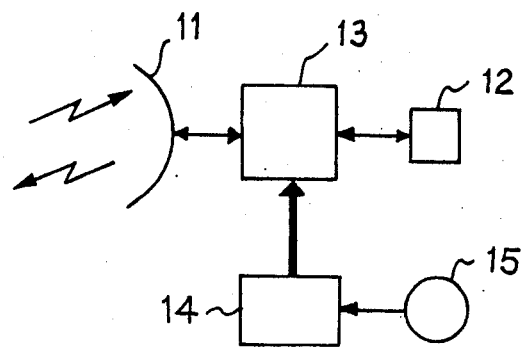
FIG. 1 is a block diagram of a known responder.
Figure 2:
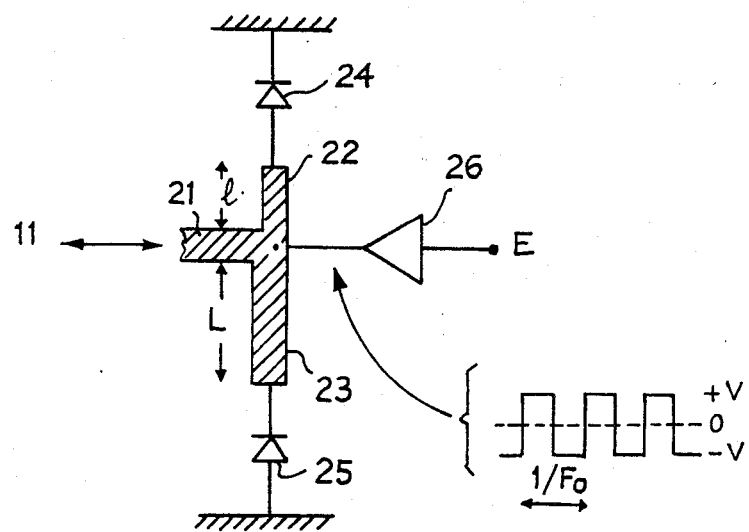
FIG. 2 is a circuit diagram of the phase shifter 13 of FIG. 1.
Figure 3:
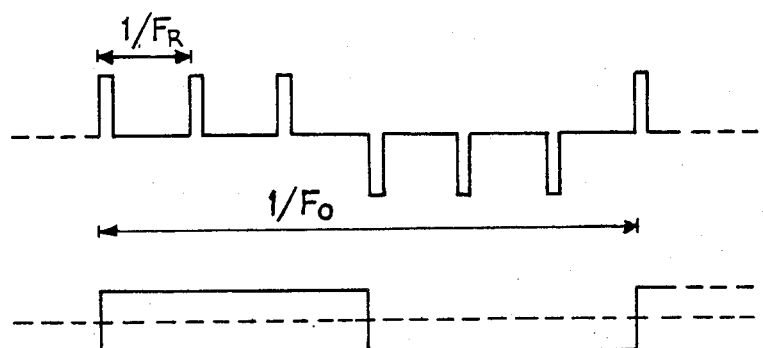
FIG. 3 represents a diagram of the signals in the responder of FIG. 1.
Figure 4:
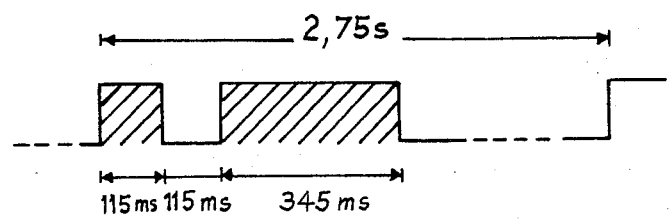
FIG. 4 represents an example of coding of the re-transmitted signals.
Figure 5:
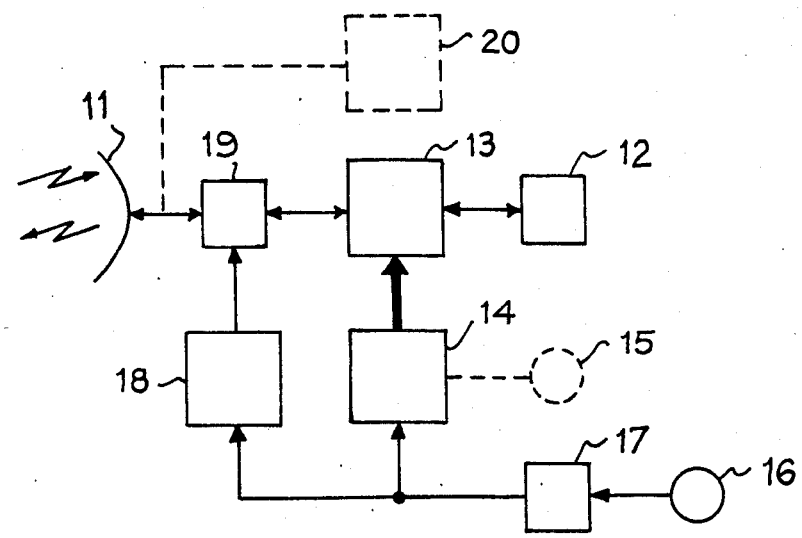
FIG. 5 is a block diagram of a responder according to the invention.

To transmit vocal data with a passive responder the diagram represented in FIG. 1 is modified in order to achieve the diagram represented in FIG. 5.

The basic system always comprises aerial 11, the short-circuit 12, the phase shifter 13, the modulator 14 and the generator 15.

The vocal data are applied to a microphone 16 that supplies a signal, which is thereafter filtered by a low pass filter 17. The cut-off frequency of this filter is lower than $F_R/2$ in order to prevent any folding problems of the spectrum. This presumes that the repetition frequency $F_r$ of the radar is sufficiently high to maintain good intelligibility of speech. This is generally the case.

Figure 6:
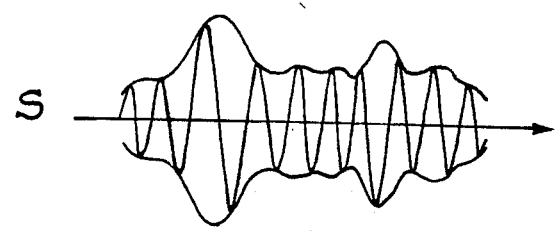
FIG. 6 represents a diagram of the signals in the responder of FIG. 5.
Figure 6:
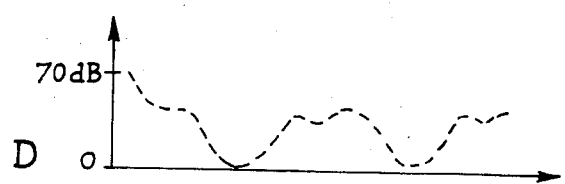

The signal S at the output of the filter is represented on the first line of FIG. 6. It can be described as an alternating signal of variable period and amplitude. The amplitude variation is low compared to the period and thus determines an envelope that approximately resembles an amplitude modulation.

This signal S is first of all applied to the modulator 14 in which it is clipped in order to obtain a rectangular control signal of the phase shifter 13. This clipped signal S becomes a signal F represented in the second line of FIG. 6. The transitions of F corresponds to the passages at zero of S, and F is thus similar to a PDM type modulated signal.

The signal re-emitted by the responder is thus modulated in phase by the signal F and the radar reconstitutes this latter by demodulation of the re-emitted signal. Such a signal could be intelligible, but with difficulty and with poor sonority.

In order to improve this intelligibility, the amplitude of S is furthermore transmitted with amplitude modulation of the signal retransmitted by the responder.

To maintain simplicity of this responder, a real modulation of the retransmitted signal is not carried out, but rather a simple attenuation approximately proportional to the envelope of S.

This amplitude A is represented in the third line of FIG. 6 and can be obtained very simply by an envelope detector 18.

Figure 7:
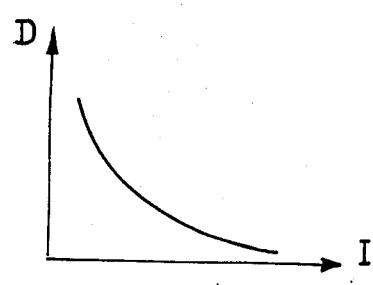
FIG. 7 represents the response curve of the attenuator 19 of FIG. 5.

To modulate the re-emission signal is inserted between the dephaser 13 and the aerial 11 a variable attenuator 19 of which the attenuation is an inverse function, substantially linear, of the control signal; this latter being the signal A supplied by the detector 18. Such an attenuator can be formed by a diode controlled in current and of which the UHF attenuation curve is represented by the graphic of FIG. 7, in which it will be observed that this attenuation D is an approximately reverse function of the direct current I.

In function of the signal A, the attenuation D of the re-transmitted signal is represented by the last line of FIG. 6 where it is seen that it reproduces fairly accurately the inverse of A with a dynamic of 70 dB. Since it involves an attenuation, the retransmitted signal will have an envelope substantially represented by A.

At the reception in the radar, it will thus only be necessary to extract the amplitude of the signal received, available for example, on an AGC output, and to modulate in amplitude the signal F, reconstituted for example, with a variable gain amplifier, in order to obtain a signal that reproduces the vocal signal S with a very sufficient fidelity.

In a variant of the invention, is used, furthermore, a generator 15 of square fixed frequency signal that allows to modulate in a constant manner the re-emission of the responder apart from the moments where the micro 16 is used.

In another variant a receiver 20 is also used in order to determine if an emission of the radar is well received; this is a way to overcome speaking in the micro in pure loss.

This receiver can be a simple rectifier diode supplying an alarm signal. It can also be more complex and comprise, for example, a decoder allowing to decode a coded interrogation emitted by the radar. A more elaborate version comprises a receiver similar to that utilized in the radar in order to demodulate the re-emission of the responder. In this case, the radar can emit an emission modulated in the same manner as in the responder, which allows a bi-directional vocal link between the radar and the responder. Only very simple material will be used in this latter and only the energy supplied by the radar is used for the transmission in both directions.

We claim:

1. Passive radar transponder, for use with a radar transmitting pulses of ultra-high-frequency waves at a recurrence rate and capable of detecting a Doppler difference frequency between transmitted and target-reflected ultra-high frequencies, of the type comprising an aerial tuned to said ultra-high-frequency signal transmitted by said radar and to be re-transmitted by said transponder, an ultra-high frequency (UHF) short-circuit connected to the aerial by a controllable phase shifter interposed between the aerial and the short circuit, and means for controlling said phase shifter, wherein said transponder comprises furthermore a controllable attenuator inserted in series with said phase shifter between the aerial and the short-circuit, means for controlling said attenuator, means for receiving a vocal signal and for converting said vocal signal into an electric audio frequency signal, and a low-pass filter for filtering said electric audio frequency signal with a cut-off frequency not exceeding half said recurrence rate of the pulses transmitted by the radar, wherein said control means for the phase shifter comprise a peak limiter for transforming the filtered electric audio frequency signal into a bipolar rectangular signal supplied to said phase shifter for switching said phase shifter between two values of phase shift separated by an interval $\pi$, said two values of phase shift corresponding respectively to the two polarities of the rectangular signal, wherein the control means of the attenuator comprise a detector connected to the output of said low pass filter for detecting the envelope of the filter output signal and applying the detected envelope as a control signal to said attenuator, and wherein the attenuator has an attenuation characteristic curve for providing attenuation substantially in inverse proportion to the magnitude of its control signal.

2. Transponder according to claim 1, wherein the attenuator comprises a UHF diode forwardly biased by a current that is proportional to the envelope signal.

3. Transponder according to claim 1, which further comprises, a generator for supplying a constant frequency to the control means of the phase shifter during periods in which said vocal signal is absent.

4. Transponder according to claim 1, wherein it comprises, furthermore, a decoder in order to detect a particular characteristic of the radar emission.

5. Transponder according to claim 4, wherein said decoder is a demodulator capable of detecting modulation of the same kind as that brought by the responder to the signals re-emitted by the responder.

* * * * *